Dec. 15, 1942.    A. B. CORKISH    2,305,065
CARPENTER'S SHINGLING GAUGE
Filed Jan. 28, 1942
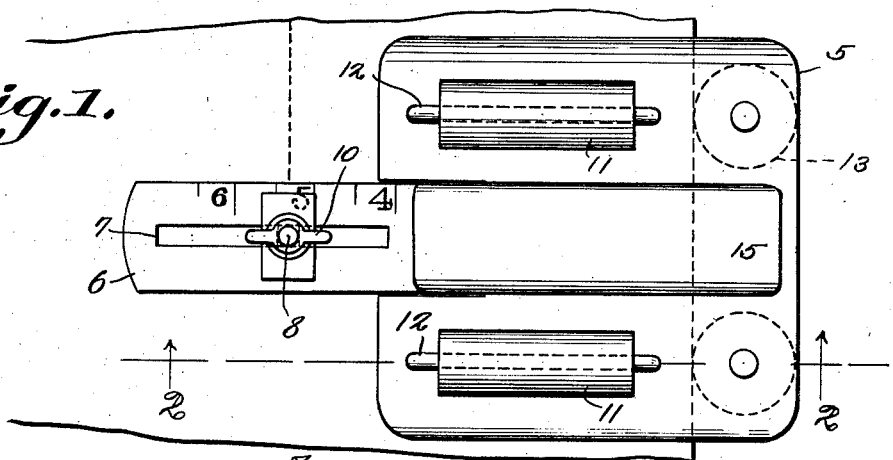
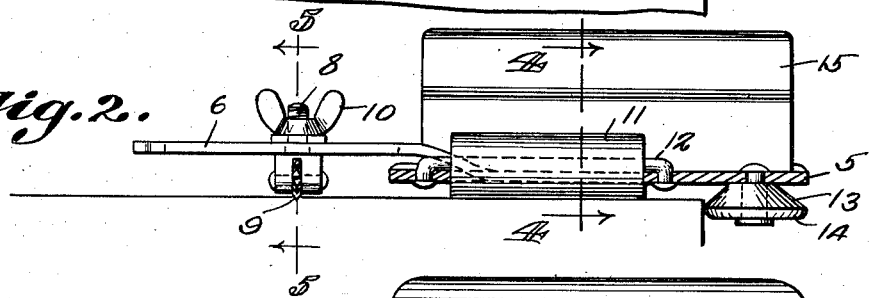
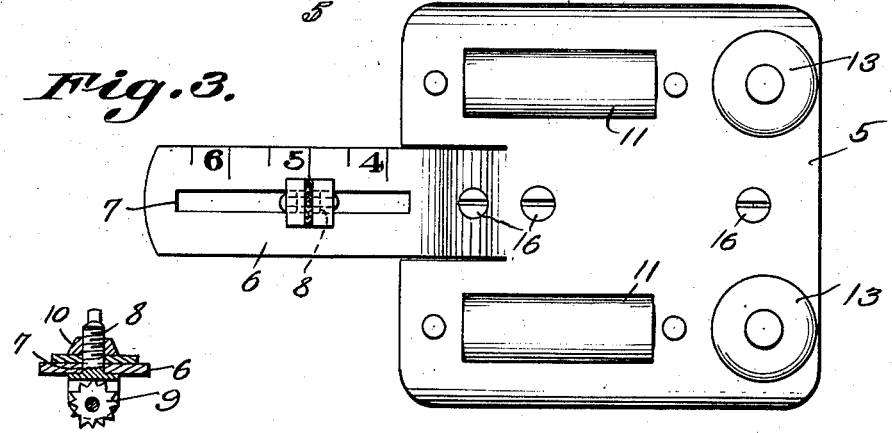
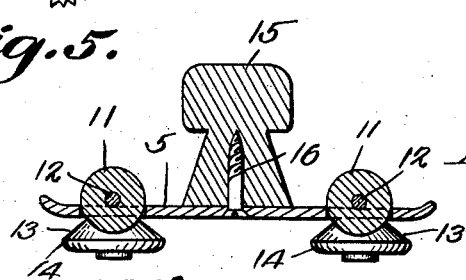
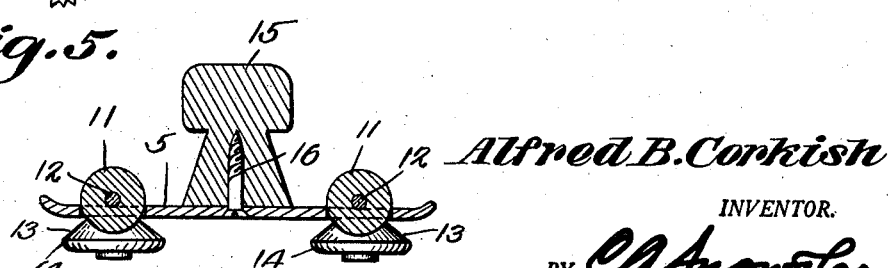
Alfred B. Corkish
INVENTOR.
BY C. A. Snow & Co.

Patented Dec. 15, 1942

2,305,065

UNITED STATES PATENT OFFICE 2,305,065

CARPENTER'S SHINGLING GAUGE

Alfred B. Corkish, Nantucket, Mass.

Application January 28, 1942, Serial No. 428,608

3 Claims. (Cl. 33—42)

This invention relates to a carpenter's gauge, and more particularly to a gauge especially designed for use in gauging and marking shingles, so that the proper position of each course with respect to the preceding course of shingles, may be accurately determined, thereby facilitating the laying of shingles, in roof construction.

An important object of the invention is to provide a gauge of this character including a scribing wheel, adjustably mounted on the body of the gauge whereby the gauge may be set to meet various requirements of use.

Another object of the invention is to provide a tool of a construction, wherein the scribing wheel will operate in a true vertical plane at all times, thereby insuring an accurate marking of the shingles.

Still another object of the invention is to provide gauging wheels having beveled upper surfaces, to the end that the shingle-contacting edges of the gauge wheels, are exceptionally narrow, reducing friction between the gauge wheels and shingles to a minimum, thereby increasing the degree of accuracy in the use of the tool.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing

Figure 1 is a plan view of a carpenter's shingle gauge, constructed in accordance with the invention.

Figure 2 is a sectional view taken on line 2—2 of Figure 1.

Figure 3 is a bottom view of the gauge.

Figure 4 is a sectional view taken on line 4—4 of Figure 2.

Figure 5 is a sectional view taken on line 5—5 of Figure 2.

Referring to the drawing in detail, the body portion which is indicated by the reference character 5 is constructed preferably of a length of sheet metal material, there being provided an arm 6 extending from one edge of the body portion, as clearly shown by Figure 3 of the drawing.

The arm 6 is slightly offset with respect to the upper and lower surfaces of the body portion 5, and is provided with an elongated opening 7 formed intermediate the side edges thereof. The opening 7 is designed to accommodate the shank 8 of the scribing wheel 9, the shank 8 being held in various positions of adjustment throughout the length of the arm 6, by means of the nut 10 which is shown as positioned on the threaded portion of the shank. Thus it will be seen that due to this construction, the scribing wheel may be moved to various positions along the slot for regulating the length of the mark made by the gauge, from the end of the shingle. In order to facilitate this adjustment, graduations are formed on the arm, as clearly shown by Figure 3. Because of the offset construction of the arm, the body portion of the gauge will be maintained in true horizontal relation with the upper surface of the shingles being marked, to insure an accurate marking of the shingles.

Disposed adjacent to the side edges of the body portion 5, are elongated openings, in which the rollers 11 operate, the rollers being mounted on the shafts 12 that have their ends extended downwardly through openings in the body portion, where the ends of the shafts are headed, to prevent displacement of the shafts.

Since the rollers 11 extend through the openings in the body portion, it will be seen that they provide a support for the body portion as it is being moved over the shingles being marked.

Mounted on the undersurface of the body portion 5, at points adjacent to the outer ends of the rollers 11, are wheels 13 which have their upper surfaces beveled, and their lower surfaces curved as at 14, presenting exceptionally fine shingle-edge contacting surfaces. Because of the construction of these wheels 13, the frictional contact between the wheels and shingles, is reduced to a minimum, permitting the tool to be moved with little exertion on the part of the operator, and with the assurance that the tool will not twist, due to binding, when in use.

The handle, by means of which the gauge is operated, is indicated by the reference character 15, and as shown is substantially long so that it may be gripped by the hand of the user in such a way that the gauge will be prevented from twisting as it is being moved to accomplish the purpose of the invention. The handle is secured by means of the screws 16 that are shown as extended through openings in the body portion 5, and embedded in the handle, which is constructed preferably of wood.

From the foregoing it will be seen that due to the construction shown and described, I have provided a carpenter's gauge to be used in laying shingles, whereby, after the initial course of shingles has been laid, the carpenter may, by moving the gauge along the lower edge of the course of shingles, mark the shingles to indicate a line on which the lower ends of the next course of shingles should fall, in the construction of an accurate shingle roof.

What is claimed is:

1. A shingle gauge comprising a body portion, said body portion having elongated openings formed therein and arranged adjacent to the longitudinal edges of the body portion, elongated rollers mounted within the openings and extending beyond the upper and lower faces of the body portion, said rollers adapted to support the gauge while in use, an arm extending from one edge of the body portion, said arm being offset with respect to the upper and lower faces of the body portion, a scribing wheel adjustably mounted on said arm, the periphery of the scribing wheel operating in a plane with the lowest point of the periphery of the rollers, wheels mounted on the body portion and operating in a horizontal plane, and said wheels adapted to engage the ends of shingles being gauged, holding the gauge against twisting, as the gauge is moved over the shingles.

2. A shingle gauge comprising a body portion including a length of sheet metal material, an arm extending from one end of the body portion, said arm being offset upwardly with respect to the body portion, a scribing wheel adjustably mounted on the arm for movement longitudinally of the arm, rollers mounted on the body portion and extending below the bottom surface of the body portion in a line with the scribing wheel, wheels mounted on the body portion and extending below the bottom surface of the body portion, the upper surfaces of the wheels being beveled presenting substantially narrow shingle-contacting edges, and a handle by means of which the gauge is moved over shingles being gauged.

3. A shingle gauge comprising a body portion formed of a length of sheet metal material, said body portion having longitudinal openings adjacent to the side edges thereof, rollers mounted within the openings and extending beyond the upper and lower surfaces of the body portion, shafts on which the rollers are mounted, said shafts having right-angled end portions extended through openings in the body portion, securing the rollers in position, wheels mounted adjacent to one end of the body portion and extended below the bottom surface of the body portion, said wheels operating in a horizontal plane and adapted to engage the ends of shingles being gauged, an arm extending from one end of the body portion, and a scribing wheel adjustable longitudinally of the arm and adapted to mark a shingle over which the gauge is moved.

ALFRED B. CORKISH.